(12) United States Patent
Tsukamoto

(10) Patent No.: US 8,521,011 B2
(45) Date of Patent: Aug. 27, 2013

(54) RECEIVING APPARATUS AND ITS CONTROL METHOD, COMPUTER PROGRAM, AND STORAGE MEDIUM

(75) Inventor: Nobuyuki Tsukamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1997 days.

(21) Appl. No.: 11/438,325

(22) Filed: May 23, 2006

(65) Prior Publication Data

US 2006/0280446 A1 Dec. 14, 2006

(30) Foreign Application Priority Data

Jun. 7, 2005 (JP) ................................. 2005-167348

(51) Int. Cl.
*H04N 5/93* (2006.01)
*H04N 5/765* (2006.01)

(52) U.S. Cl.
USPC .......................................... 386/353; 386/200

(58) Field of Classification Search
USPC ............................................................ 386/68
See application file for complete search history.

(56) References Cited

U.S. PATENT DOCUMENTS

| 6,292,621 | B1 | 9/2001 | Tanaka et al. | |
|---|---|---|---|---|
| 7,245,821 | B2* | 7/2007 | Okada | 386/68 |
| 2003/0123849 | A1* | 7/2003 | Nallur et al. | 386/68 |
| 2004/0156619 | A1* | 8/2004 | Wada | 386/68 |
| 2004/0194143 | A1* | 9/2004 | Hirose | 725/97 |
| 2007/0092218 | A1* | 4/2007 | Nakashika et al. | 386/95 |

FOREIGN PATENT DOCUMENTS

| JP | 9-214889 | 8/1997 |
|---|---|---|
| JP | 2004-242172 | 8/2004 |

* cited by examiner

*Primary Examiner* — William C Vaughn, Jr.
*Assistant Examiner* — Asher Khan
(74) *Attorney, Agent, or Firm* — Fitzpatrick, Cella, Harper & Scinto

(57) ABSTRACT

An apparatus and method allow playback of transferred moving image data by a receiving apparatus for confirmation of the received contents even when the transfer rate of moving image data for normal playback is high and when the processing capability and displaying capability of the apparatus on the receiving side are low. To this end, when the transfer rate of moving image data for normal playback is high and when the processing capability and displaying capability of a personal computer are low, received image data for high speed playback is displayed in place of decoding and displaying received moving image data for normal playback.

16 Claims, 6 Drawing Sheets

RECEIVING APPARATUS AND ITS CONTROL METHOD, COMPUTER PROGRAM, AND STORAGE MEDIUM

FIELD OF THE INVENTION

The present invention relates to a receiving apparatus and its control method, a computer program, and a storage medium.

BACKGROUND OF THE INVENTION

It is conventional to provide a digital VTR which encodes image data, and records and plays back the encoded image data on and from a magnetic tape. In recent years, a device which encodes image data by an inter-frame coding method such as MPEG or the like, and records and plays back the encoded image data on and from a magnetic tape is also known.

Since MPEG encodes the difference between frames of image data, decoding cannot be done by only this difference data, and image data of a reference frame is required to decode encoded data. Also, since frames have all different data sizes in MPEG-encoded image data, the recording positions of frame data on a magnetic tape are not constant. For this reason, when image data which is MPEG-encoded and recorded undergoes high speed playback, since a magnetic head cannot accurately scan tracks on the tape, all data recorded on the tape cannot be played back, but data are discretely played back.

For this reason, the inter-frame encoded difference data and reference frame data are unlikely to be obtained together, and image data of frames encoded by intra-frame coding alone can be decoded. Hence, it becomes difficult to obtain a high-quality playback image.

To solve this problem, a technique for generating image data for high speed playback using only intra-frame encoded image data in addition to normal encoded image data, and recording the image data for high speed playback at positions scanned by the head on respective tracks upon high speed playback has been proposed (see Japanese Patent Laid-Open No. 9-214889, counterpart U.S. Pat. No. 6,292,621). With this technique, a high-quality playback image can also be obtained upon high speed playback.

Also, the following technique has been proposed (see Japanese Patent Laid-Open No. 2004-242172, counterpart US2004156619). A moving image data sequence including moving image data for normal playback which is encoded according to an MPEG2 packetized elementary stream (PES) format and image data for high speed playback is recorded to form a large number of tracks. When the moving image data for normal playback and image data for high speed playback are played back to be output as digital data, the moving image data for normal playback in the PES format and the image data for high speed playback, which are played back, are multiplexed in an MPEG2 transport stream (TS) format and the multiplexed data is output to a digital interface (DIF).

One example of the prior art, which corresponds to Japanese Patent Laid-Open No. 2004-242172, relates to the multiplexing of the image data for high speed playback in an encoded state, and the outputting of the image data to the DIF. Therefore, an external apparatus as an output destination need not generate new image data for high speed playback.

Processing in the external apparatus occurs as follows. Upon reception of moving image data for normal playback and image data for high speed playback, which are output from a playback apparatus, the moving image data can be decoded and displayed on a display unit of the apparatus, so as to visually confirm the received contents. In this case, when the transfer rate of the moving image data for normal playback is high, and the processing capability and displaying capability of the external apparatus are low, decoding processing and display processing cannot be done in time upon decoding and displaying the moving image data for normal playback on the display unit, thus generating a disturbance such as block noise or the like on the display screen.

The present invention has been made to solve such problems, and has as its object to allow playback for confirming the received contents even when the transfer rate of moving image data for normal playback is high and the processing capability and displaying capability of an external apparatus on the receiving side are low.

SUMMARY OF THE INVENTION

In order to achieve the above object, according to the present invention, there is provided a receiving apparatus which is connected to an image output apparatus that outputs moving image data and digest data of the moving image data, and receives the output moving image data and the digest data. The apparatus comprises a receiving interface adapted to receive the moving image data and the digest data from the image output apparatus, a storage unit adapted to store the moving image data and the digest data received via the receiving interface, a display unit adapted to play back and display an image, a display controller adapted to display at least the moving image data or the digest data on the display unit, and a selector adapted to select the moving image data or the digest data on the basis of processing capability of the display controller and a transfer rate of the moving image data, and wherein the display controller displays the moving image data or the digest data selected by the selector on the display unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
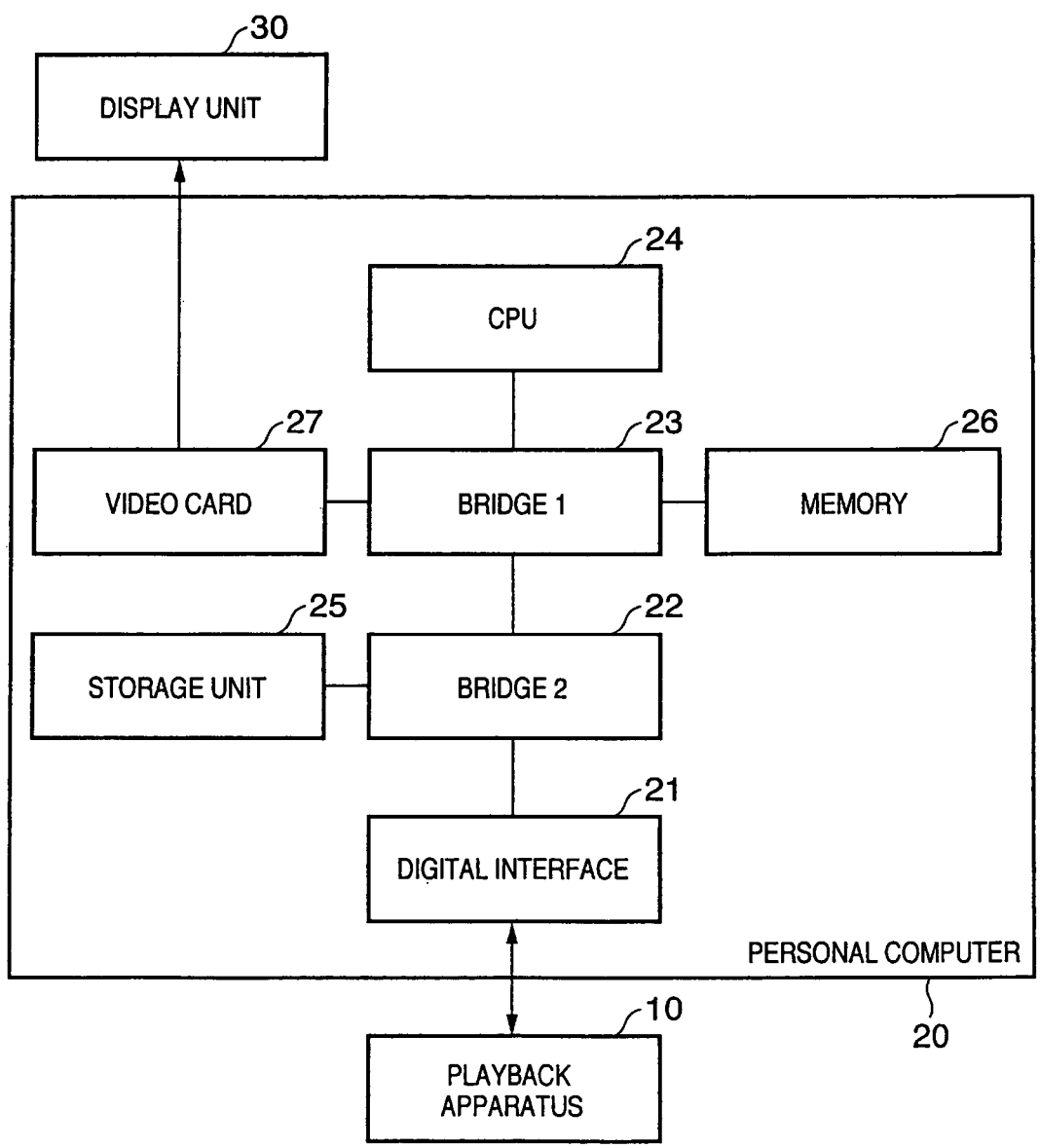
FIG. 1 is a block diagram showing an example of the arrangement of a receiving apparatus according to an embodiment of the present invention.

FIG. 1 is a block diagram showing the arrangement of a personal computer 20 on which an application according to the present invention runs and which serves as a receiving apparatus. The personal computer 20 is connected to a playback apparatus 10, which serves as an image output apparatus for outputting moving image data to the personal computer 20, via a digital interface 21. The digital interface 21 can be implemented as, e.g., an IEEE1394 interface. The playback apparatus 10 is, e.g., a digital video camera. Alternatively, the playback apparatus 10 may be an information processing apparatus such as a digital still camera, a notebook type personal computer, a PDA, or the like, which can output a captured moving image to the personal computer 20. The personal computer 20 is connected to a display unit 30. The display unit 30 is preferably a display monitor for the personal computer. The playback apparatus 10 transmits moving image data for normal playback, which is encoded using intra-frame coding and inter-frame coding, and image data for high speed playback as digest data of the moving image data for normal playback using an IEEE1394 interface.

Note that the moving image data for normal playback in this embodiment corresponds to MPEG-2 TS (transport stream) data generated by packetizing an elementary stream, which is obtained by compression-encoding a moving image signal according to MPEG-2, in the MPEG-2 TS format.

Figure 2:
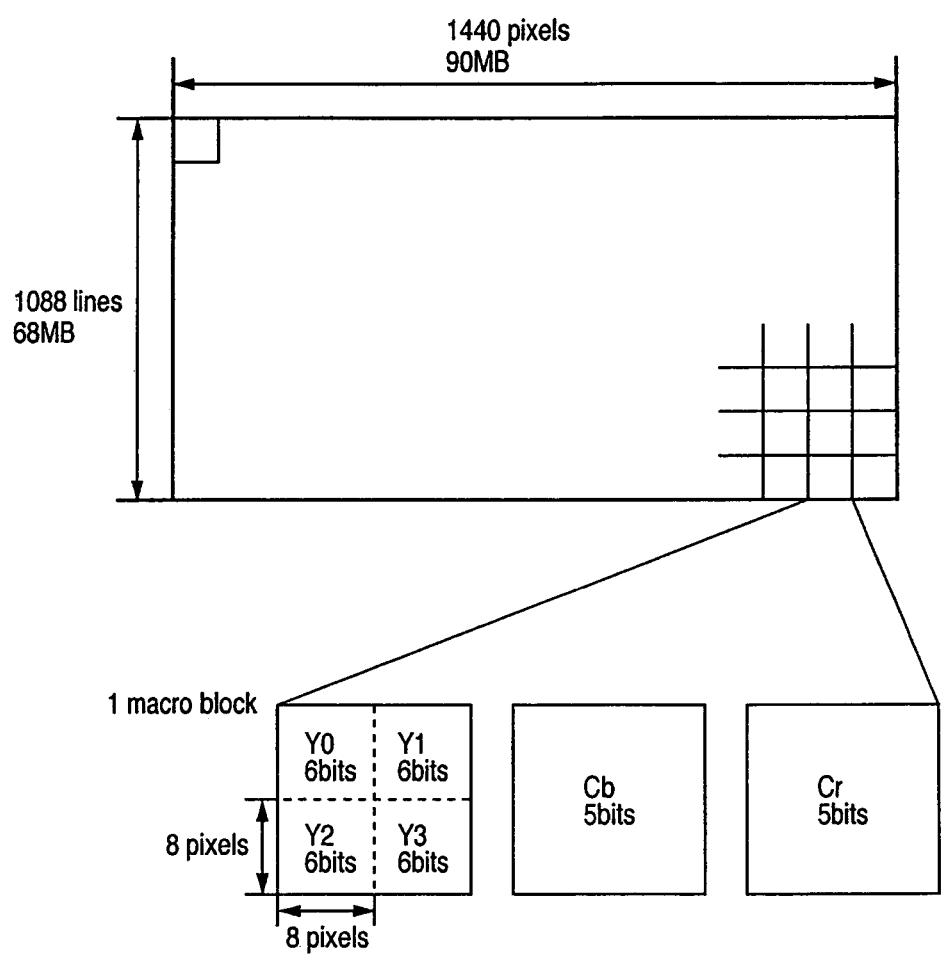
FIG. 2 is a view for explaining the structure of image data for high speed playback according to the embodiment of the present invention.

The structure of the image data for high speed playback will be described below with reference to FIG. 2. The image data for high speed playback is generated using only image data of an intra-frame encoded frame (I frame) of a video ES (elementary stream) as data obtained by encoding a moving image signal by MPEG-2. In the image data for high speed playback, as shown in FIG. 2, image data of the I frame having a resolution of 1440 (pixels)×1088 (lines) is broken up into 90×68 16 (pixels)×16 (pixels) macroblocks (MBs). Each of luminance signals (Y0, Y1, Y2, and Y3) of each macroblock is expressed by 6 bits, and each of color difference signals (Cr, Cb) of each macroblock is expressed by 5 bits.

Therefore, the resolution of the image data for high speed playback is 180×136. The intra-frame encoded I frame is included only at the head of one GOP (Group of Pictures), and one GOP corresponds to a video picture for 0.5 sec. Hence, the playback apparatus transmits image data for high speed playback (for one frame) at 0.5-sec intervals.

The image data for high speed playback is multiplexed on the moving image data for normal playback in the MPEG-2 transport stream (TS) format, and is transmitted to the IEEE1394 interface.

Referring back to FIG. 1, an application program according to this embodiment is loaded onto a memory 26 of the personal computer 20 by a storage unit 25 (to be described later). The application program loaded onto the memory 26 is executed by a CPU 24. When this application program is executed, the moving image data for normal playback and image data for high speed playback which are received via the digital interface 21 are stored in the storage unit 25 via bridge 2 (22). The storage unit 25 may comprise a hard disk or a storage medium such as a writable DVD or the like.

Upon execution of the application program, the moving image data for normal playback and image data for high speed playback which are received via the digital interface 21 are transferred to the memory 26 via bridge 1 (23). After transfer, the moving image data for normal playback and image data for high speed playback are decoded by CPU 24, and RGB or YUV (luminance and color difference) signal data are output to the display unit 30 via a video card 27, thus playing back image data.

The operation of the application executed by the personal computer 20 according to this embodiment will be described below with reference to FIG. 3.

Figure 3:
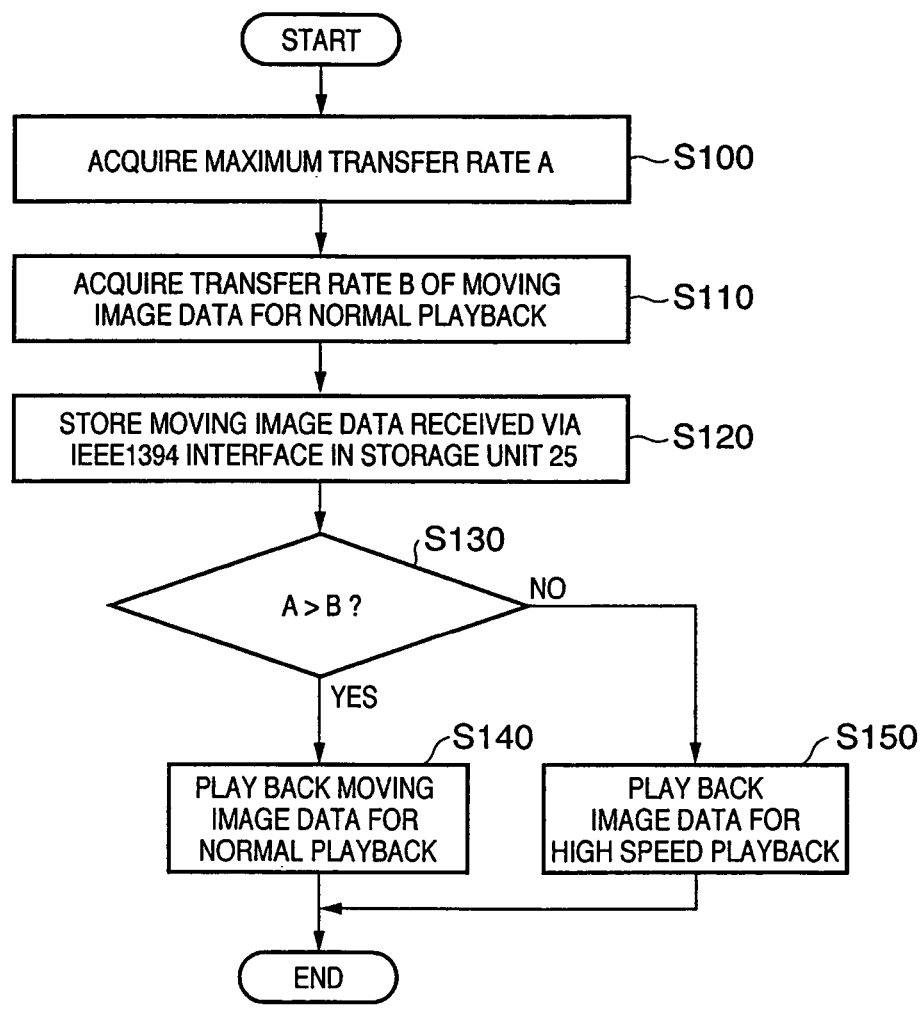
FIG. 3 is a flowchart showing an example of processing by an application program according to the first embodiment of the present invention.

Referring to FIG. 3, in step S100 a maximum transfer rate (A) in the personal computer 20 is acquired. This maximum transfer rate (A) is the transfer rate of moving image data permitted based on a combination of the processing capability and displaying capability of the personal computer 20. Note that the processing capability is calculated based on the processing speed of the CPU 24 as a processing unit which decodes moving image data. The displaying capability is calculated based on the specifications, such as a video memory size and the like of the video card 27, which serves as a temporary memory for displaying the decoded moving image data on the display unit 30. When an MPEG-2 elementary stream as moving image data for normal playback having a transfer rate lower than the maximum transfer rate is decoded, it can be displayed without any disturbance (e.g., noise or the like) in a video picture.

In step S110, a transfer rate (B) of the MPEG-2 TS data transmitted from the playback apparatus 10 is acquired. This transfer rate can be acquired by transmitting an "Output Plug Signal Format" command as an AVC command of IEEE1394 to the playback apparatus 10 and receiving its response.

In step S120, image data received from the playback apparatus 10 is stored in the storage unit 25. More specifically, when the moving image data for normal playback or image data for high speed playback is received from the digital interface 21, an Isochronous packet header and CIP (Common Isochronous Packet) header are removed from the received data. After that, the image data is stored in the storage unit 25 via bridge 2 (22).

In step S130, the maximum transfer rate A acquired in step S100 is compared with the transfer rate B acquired in step S110. If A>B, it is determined that the processing capability and displaying capability of the personal computer 20 have a level high enough to decode and display the moving image data for normal playback of the MPEG-2 TS without any disturbance (noise or the like). In this case (if "YES" in step S130), the flow advances to step S140. On the other hand, if A is not greater than B, it is determined that the processing capability and displaying capability of the personal computer are not high enough to decode and display the moving image data for normal playback of the MPEG-2 TS without any disturbance (noise or the like). In this case (if "NO" in step S130), the flow advances to step S150.

More specifically, the application can require 3 GHz or higher as the lowest CPU processing capability and 8 Mbytes (Mega Bytes) as the smallest memory size of the video card so as to decode and display MPEG-2 TS data having a transfer rate of, e.g., 27 Mbps (Megabits per second). Note that numerical values quoted in this case are merely examples, and the scope of the present invention is not limited to such specific numerical values. In this case, if the CPU processing capability of the personal computer is 2 GHz and the memory size of the video card is 4 Mbytes, it is determined that it is hard to decode image data having a transfer rate of 27 Mbps without any disturbance (noise or the like).

In step S140, the moving image data for normal playback is played back. More specifically, the moving image data for normal playback is transferred to the memory 26 via bridge 2 (22) and bridge 1 (23). A TS header is removed from the moving image data for normal playback transferred to the memory 26, and the moving image data is separated into a video elementary stream and an audio elementary stream. The video elementary stream is decoded and is output to the display unit 30 via the video card 27 in the format of RGB data or YUV data.

On the other hand, in step S150 the image data for high speed playback is played back. More specifically, the image data for high speed playback for one frame, which is received from the digital interface 21 as the IEEE1394 interface, is transferred to the memory 26 via bridge 2 (22) and bridge 1 (23). The image data for high speed playback for one frame transferred to the memory 26 is decoded and is output to the display unit 30 via the video card 27 in the format of RGB data or YUV data. Note that the image data for high speed playback can be easily decoded since it is already expressed by the luminance and color difference signals, as shown in FIG. 2. Also, the image data for high speed playback requires little processing capability of the CPU 24 since it need only be decoded and displayed once per 0.5 sec. Furthermore, the image data for high speed playback requires very low displaying capability since it has a small display size.

When the personal computer 20 as the receiving apparatus plays back image data according to the above flowchart, the execution order of operations shown in respective blocks is not limited to that shown in FIG. 3. For example, two successive blocks may be executed substantially at the same time in practice (e.g., steps S120 and S130), or blocks may be executed in a reverse order according to the functions included (e.g., steps S100 and S110).

As described above, the receiving apparatus according to this embodiment can select the moving image data for normal playback or image data for high speed playback in accordance with the processing capability and displaying capability of image data in the receiving apparatus for moving image data received from the playback apparatus via the digital interface compliant with the IEEE1394 standard. In this way, moving image playback suited to the processing capability of the receiving apparatus can be performed. Therefore, a receiving apparatus with a high speed processing capability and displaying capability can display high-quality moving image data for normal playback without any disturbance (noise or the like). On the other hand, a receiving apparatus with low capability efficiently confirms the contents of received image data using image data for high speed playback.

Second Embodiment

In the first embodiment, IEEE1394 has exemplified as the digital interface 21 in FIG. 1. By contrast, this embodiment will exemplify a case wherein the digital interface 21 is a USB (Universal Serial Bus) interface. The operation of the application executed by the personal computer 20 according to this embodiment will be described below with reference to FIG. 4.

In this embodiment, the playback apparatus 10 transmits image data for high speed playback by Isochronous transfer, Interrupt transfer, or Bulk transfer of USB.

In step S200, the maximum transfer rate (A) in the personal computer 20 is acquired. This maximum transfer rate is the same as that in the first embodiment, and is calculated based on a combination of the processing capability of the personal computer 20, i.e., the processing speed of the CPU 24, and the displaying capability, i.e., the specifications such as the video memory size and the like of the video card 27.

In step S210, a transfer rate (B) of MPEG-2 TS data transmitted from the playback apparatus 10 is acquired. This transfer rate can be acquired by transmitting Video Probe/Commit Control as control of the USB Video Class standard to the playback apparatus 10 and receiving dwMaxPayloadTransferSize as its response data.

In step S220, image data received from the playback apparatus 10 is stored in the storage unit 25. More specifically, when moving image data for normal playback or image data for high speed playback is received from the digital interface 21, a stream header of the USB Video Class standard is removed from the received data. After that, the image data is stored in the storage unit 25 via bridge 2 (22).

In step S230, the maximum transfer rate A acquired in step S200 is compared with the transfer rate B acquired in step S210. If A>B, it is determined that the processing capability and displaying capability of the personal computer 20 have a level high enough to decode and display the moving image data for normal playback of the MPEG-2 TS without any disturbance (noise or the like). In this case (if "YES" in step S230), the flow advances to step S240.

On the other hand, if A is not greater than B, it is determined that the processing capability and displaying capability of the personal computer are not high enough to decode and display the moving image data for normal playback of the MPEG-2 TS without any disturbance (noise or the like). In this case (if "NO" in step S230), the flow advances to step S250.

More specifically, in this embodiment, the application can require 3 GHz or higher as the lowest CPU processing capability and 8 Mbytes (Mega Bytes) as the smallest memory size of the video card so as to decode and display MPEG-2 TS data having a transfer rate of, e.g., 27 Mbps (Megabits per second) as in the first embodiment. Note that numerical values quoted in this case are merely examples, and the scope of the present invention is not limited to such specific numerical values. In this case, if the CPU processing capability of the personal computer is 2 GHz and the memory size of the video card is 4 Mbytes, it is determined that it is hard to decode image data having a transfer rate of 27 Mbps without any disturbance (noise or the like).

In step S240, the moving image data for normal playback is played back. More specifically, MPEG-2 TS data as the moving image data for normal playback received from the digital interface 21 as the USB interface is transferred to the memory 26 via bridge 2 (22) and bridge 1 (23). A TS header is removed from the MPEG-2 TS data as the moving image data for normal playback transferred to the memory 26, and that data is separated into a video elementary stream and an audio elementary stream. The video elementary stream is decoded and is output to the display unit 30 via the video card 27 in the format of RGB data or YUV data.

On the other hand, in step S250 the image data for high speed playback is played back. More specifically, the image data for high speed playback for one frame shown in FIG. 2, which is received from the digital interface 21 as the USB interface, is transferred to the memory 26 via bridge 2 (22) and bridge 1 (23). The image data for high speed playback for one frame transferred to the memory 26 is decoded and is output to the display unit 30 via the video card 27 in the format of RGB data or YUV data.

Figure 4:
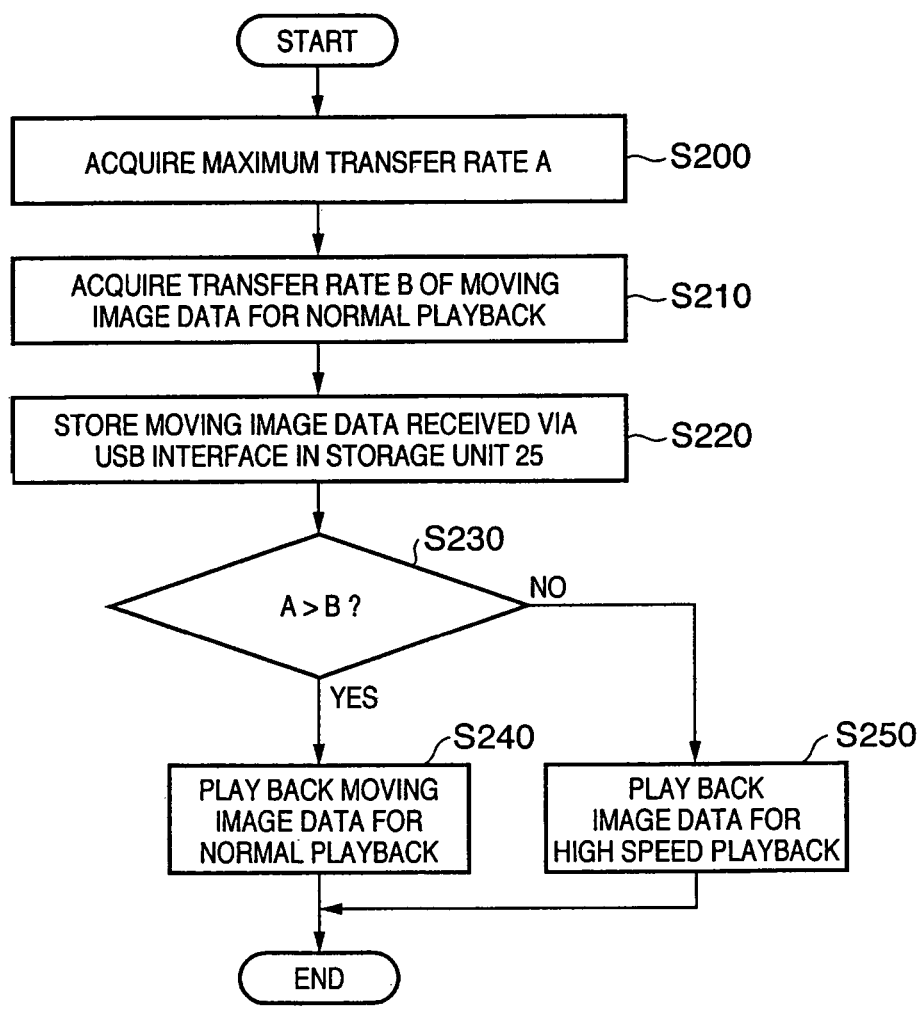
FIG. 4 is a flowchart showing an example of processing by an application program according to the second embodiment of the present invention.

When the personal computer 20 as the receiving apparatus plays back image data according to the above flowchart, the execution order of operations shown in respective blocks is not limited to that shown in FIG. 4. For example, two successive blocks may be executed substantially at the same time in practice (e.g., steps S220 and S230), or blocks may be executed in a reverse order according to the functions included (e.g., steps S200 and S210).

As described above, the receiving apparatus according to this embodiment can select the moving image data for normal playback or image data for high speed playback in accordance with the processing capability and displaying capability of image data in the receiving apparatus for moving image data received from the playback apparatus via the digital interface compliant with the USB standard. In this way, moving image playback suited to the processing capability of the receiving apparatus can be performed. Therefore, a receiving apparatus with high speed processing capability and displaying capability can display high-quality moving image data for normal playback without any disturbance (noise or the like). On the other hand, a receiving apparatus with low capability efficiently confirms the contents of received image data using image data for high speed playback.

Third Embodiment

In the first and second embodiments, the application automatically selects moving image data to be played back by the receiving apparatus. By contrast, in this embodiment, the user of the personal computer 20 as the receiving apparatus can manually designate which of image data for normal playback and that for high speed playback is to be played back.

The flow of the processing by the application according to this embodiment will be described below with reference to the flowchart of FIG. 5.

In step S300, moving image data for normal playback or image data for high speed playback is received from the digital interface 21. When the digital interface 21 is an IEEE1394 interface, an Isochronous packet header and CIP (Common Isochronous Packet) header are removed from the received data. On the other hand, when the digital interface 21 is a USB interface, a stream header of USB Video Class is removed from the received data. After the header removal, the moving image data for normal playback or image data for high speed playback is stored in the storage unit 25 via bridge 2 (22).

If the user does not input any selection instruction of a preview mode, the image data to be displayed is selected in accordance with the processing capability of the personal computer 20 as in the first embodiment.

Figure 6:
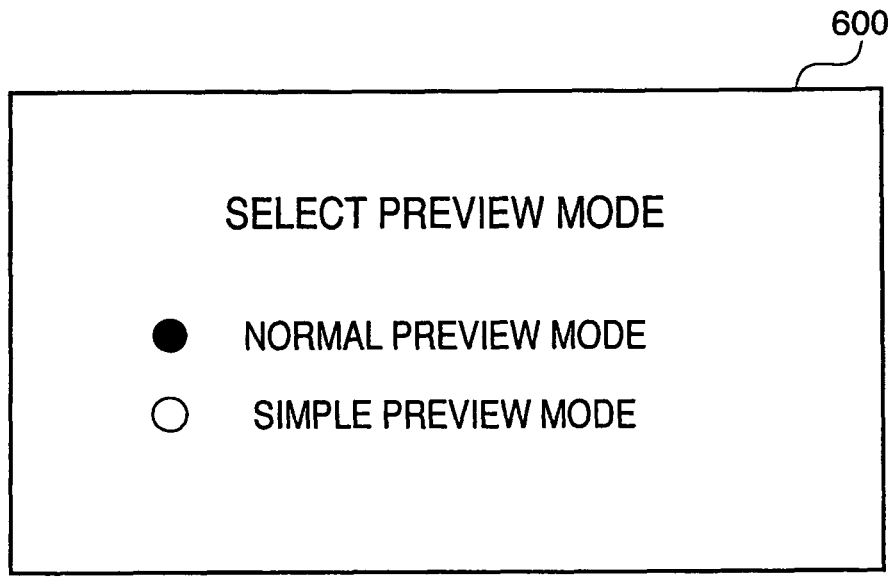
FIG. 6 shows an example of a dialog to be displayed on a display unit 30 according to the third embodiment of the present invention.

On the other hand, if selection of a preview mode is accepted from the user of the personal computer 20 as the receiving apparatus in step S310, a dialog 600 shown in FIG. 6 is displayed on the display unit 30. The user confirms this dialog 600, and can select a "normal preview mode" using moving image data for normal playback or a "simple preview mode" using image data for high speed playback. That is, the user can designate the moving image data for normal playback or image data for high speed playback by selecting this preview mode.

In step S320, the selection contents accepted from the user are determined. If the "normal preview mode" using moving image data for normal playback is selected ("YES" in step S320), the flow advances to step S330. On the other hand, if the "simple preview mode" is selected ("NO" in step S320), the flow advances to step S340.

In step S330, the moving image data for normal playback is played back. More specifically, MPEG-2 TS data as the moving image data for normal playback received from the digital interface 21 is transferred to the memory 26 via bridge 2 (22) and bridge 1 (23). A TS header is removed from the image data transferred to the memory 26, and that data is separated into a video elementary stream and an audio elementary stream. The video elementary stream is decoded and is output to the display unit 30 via the video card 27 in the format of RGB data or YUV data.

On the other hand, in step S340 the image data for high speed playback is played back. More specifically, the image data for high speed playback for one frame shown in FIG. 2, which is received from the digital interface 21, is transferred to the memory 26 via bridge 2 (22) and bridge 1 (23). The image data for high speed playback for one frame transferred to the memory 26 is decoded and is output to the display unit 30 via the video card 27 in the format of RGB data or YUV data.

Figure 5:
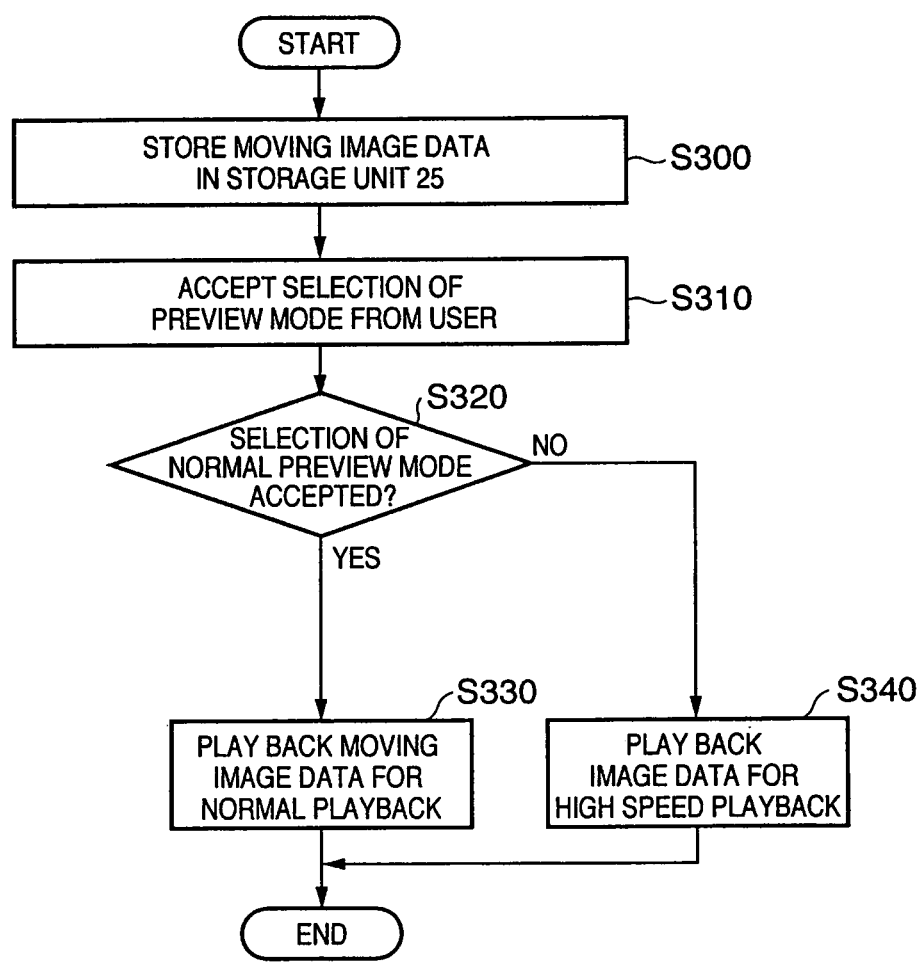
FIG. 5 is a flowchart showing an example of processing by an application program according to the third embodiment of the present invention.

When the personal computer 20 as the receiving apparatus plays back image data according to the above flowchart, the execution order of operations shown in respective blocks is not limited to that shown in FIG. 5. For example, two successive blocks may be executed substantially at the same time in practice (e.g., steps S300 and S310), or blocks may be executed in a reverse order according to the functions included (e.g., steps S300 and S310).

As described above, the receiving apparatus according to this embodiment can select the moving image data for normal playback or image data for high speed playback in accordance with the preview mode designated by the user for moving image data received from the playback apparatus via the digital interface compliant with the IEEE1394 or USB standard. That is, when the user selects the "normal preview mode", the receiving apparatus can perform playback using the moving image data for normal playback; when the user selects the "simple preview mode", it can perform playback using the image data for high speed playback. In this way, moving image playback according to user's favor can be made.

Note that this embodiment can also determine whether or not the processing capability of the personal computer 20 is low and the received image data for normal playback can be normally displayed. As a result, if it is determined that the image data cannot be normally displayed, when the user selects the "normal preview mode", a message indicating that the image data cannot often be normally displayed may be displayed on the display unit 30.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (a DVD-ROM, a DVD-R and a DVD-RW).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-167348, filed Jun. 7, 2005, which is hereby incorporated by reference herein in its entirety.

What is claimed is:

1. A receiving apparatus having a central processing unit and a memory that stores a program which is executed by the central processing unit, said receiving apparatus comprising:
a receiving unit configured to receive moving image data and digest data of the moving image data output from an image output apparatus and to store the moving image data and the digest data in a storage unit;
a display controller configured to output the moving image data and the digest data stored in the storage unit to a display device;
a detection unit configured to automatically detect a maximum transfer rate based on a processing capability of the central processing unit and a processing capability of said display controller; and
a selector configured to automatically select one of the moving image data and the digest data based on the maximum transfer rate detected by said detection unit, wherein said selector automatically selects the moving image data if the maximum transfer rate is greater than a transfer rate of the moving image data, and automatically selects the digest data if the maximum transfer rate is not greater than the transfer rate of the moving image data, and
wherein said display controller outputs the moving image data or the digest data selected by said selector to the display unit device.

2. The apparatus according to claim 1, wherein the moving image data is encoded,
wherein said display controller comprises a decoding unit configured to decode the moving image data, and a temporary memory configured to temporarily store the decoded moving image data so as to display the moving image data on the display device, and
wherein the processing capability of said display controller includes the processing speed of said decoding unit, and the memory capacity of said temporary memory.

3. The apparatus according to claim 2, wherein the moving image data is encoded by selectively using an inter-frame coding and an intra-frame coding, and
wherein the digest data includes only image data of a frame encoded by the intra-frame coding of the moving image data.

4. The apparatus according to claim 1, wherein said receiving unit is compliant with the IEEE1394 standard.

5. The apparatus according to claim 1, wherein said receiving unit is compliant with the USB standard.

6. A method of controlling a receiving apparatus which comprises a display controller configured to output, to a display device, moving image data and digest data stored in a storage unit, said method comprising:
a step of receiving, by a receiving unit, the moving image data and the digest data of the moving image data output from an image output apparatus and of storing the moving image data and the digest data in the storage unit;
a step of automatically detecting a maximum transfer rate based on a processing capability of a central processing unit of the receiving apparatus and a processing capability of the display controller;
a selection step of automatically selecting one of the moving image data and the digest data based on the maximum transfer rate detected by said detecting step, wherein said selection step automatically selects the moving image data if the maximum transfer rate is greater than a transfer rate of the moving image data, and automatically selects the digest data if the maximum transfer rate is not greater than the transfer rate of the moving image data; and
a step of outputting, by the display controller to the display device, the moving image data or the digest data selected in said selection step.

7. The method according to claim 6, wherein the moving image data is encoded,
wherein the display controller comprises a decoding unit, configured to decode the moving image data, and a temporary memory, configured to temporarily store the decoded moving image data so as to display the moving image data on the display device, and
wherein the processing capability includes the processing speed of the decoding unit, and the memory capacity of the temporary memory.

8. The method according to claim 7, wherein the moving image data is encoded by selectively using an inter-frame coding and an intra-frame coding, and
wherein the digest data includes only image data of a frame encoded by intra-frame coding of the moving image data.

9. The method according to claim 6, wherein the receiving unit is compliant with the IEEE1394 standard.

10. The method according to claim 6, wherein the receiving unit is compliant with the USB standard.

11. A non-transitory computer-readable storage medium storing a computer program for making a computer function as a receiving apparatus comprising:
   a receiving unit configured to receive moving image data and digest data of the moving image data output from an image output apparatus and to store the moving image data and the digest data in a storage unit;
   a display controller configured to output the moving image data and the digest data stored in the storage unit to a display device;
   a detection unit configured to automatically detect a maximum transfer rate based on a processing capability of the central processing unit and a processing capability of said display controller; and
   a selector configured to automatically select one of the moving image data and the digest data based on the maximum transfer rate detected by said detection unit,
   wherein said selector automatically selects the moving image data if the maximum transfer rate is greater than a transfer rate of the moving image data, and automatically selects the digest data if the maximum transfer rate is not greater than the transfer rate of the moving image data, and
   wherein said display controller outputs the moving image data or the digest data selected by said selector to the display device.

12. A receiving apparatus having a central processing unit and a memory that stores a program which is executed by the central processing unit, said receiving apparatus comprising:
   a receiving unit configured to receive, from an image output apparatus, first moving image data and second moving image data which has a lower number of pixels than the first moving image data and which relates to the first moving image data;
   a display controller configured to output the first moving image data and the second moving image data received by the receiving unit to a display device;
   a discriminating unit configured to automatically discriminate whether the display controller can display the first moving image data on the display device or not based on a processing capability of the central processing unit and a processing capability of said display controller; and
   a selector configured to automatically select one of the first moving image data and the second moving image data in accordance with a discrimination result by said discriminating unit,
   wherein said selector automatically selects the first moving image data such that the display controller outputs the first moving image data to the display device if it is discriminated by said discriminating unit that said display controller can display the first moving image data on the display device, and automatically selects the second moving image data such that said display controller outputs the second moving image data to the display device if it is discriminated by said discriminating unit that said display controller cannot display the first moving image data on the display device.

13. A receiving apparatus according to claim 12, wherein the receiving apparatus comprises a personal computer, and
   wherein said discriminating unit and said selector comprises application programs executed by the central processing unit.

14. A receiving apparatus according to claim 12, wherein said receiving unit receives a stream where the first moving image data and the second moving image data are multiplexed.

15. A receiving apparatus according to claim 12, wherein said discriminating unit discriminates whether or not said display controller can display the first moving image data on the display device without disturbance.

16. A non-transitory computer-readable storage medium storing a computer program for controlling a computer comprising (a) a receiving unit configured to receive, from an image output apparatus, first moving image data and second moving image data which has a lower number of pixels than the first moving image data and which relates to the first moving image data, and (b) a display controller configured to output the first moving image data and the second moving image data received by the receiving unit to a display device, the computer program including program codes that implement functions of an apparatus comprising:
   a discriminating unit configured to automatically discriminate whether the display controller can display the first moving image data on the display device or not based on a processing capability of a central processing unit of the computer and a processing capability of the display controller; and
   a selector configured to automatically select one of the first moving image data and the second moving image data in accordance with a discrimination result by the discriminating unit,
   wherein the selector automatically selects the first moving image data such that the display controller outputs the first moving image data to the display device if it is discriminated by the discriminating unit that the display controller can display the first moving image data on the display device, and automatically selects the second moving image data such that the display controller outputs the second moving image data to the display device if it is discriminated by the discriminating unit that the display controller cannot display the first moving image data on the display device.

* * * * *